Feb. 7, 1967 F. R. GRUBER 3,302,874

PORTABLE TAPE PERFORATOR

Filed Dec. 9, 1964 6 Sheets-Sheet 1

INVENTOR.
FRANCOIS R. GRUBER
BY
Kenway, Jenney & Hildreth
ATTORNEYS

Feb. 7, 1967 F. R. GRUBER 3,302,874

PORTABLE TAPE PERFORATOR

Filed Dec. 9, 1964 6 Sheets-Sheet 2

INVENTOR.
FRANCOIS R. GRUBER
BY
Kenway, Jenney & Hildreth
ATTORNEYS

Feb. 7, 1967 F. R. GRUBER 3,302,874

PORTABLE TAPE PERFORATOR

Filed Dec. 9, 1964 6 Sheets-Sheet 3

INVENTOR.
FRANCOIS R. GRUBER
BY
Kenway, Jenney & Hildreth
ATTORNEYS

INVENTOR.
FRANCOIS R. GRUBER
BY
Kenway, Jenney & Hildreth
ATTORNEYS

INVENTOR.
FRANCOIS R. GRUBER
BY
Kenway, Jenney & Hildreth
ATTORNEYS

INVENTOR.
FRANCOIS R. GRUBER
BY
Kenway, Jenney & Hildreth
ATTORNEYS

United States Patent Office 3,302,874

Patented Feb. 7, 1967

3,302,874

PORTABLE TAPE PEFORATOR

Francois Rene Gruber, North Wilmington, Mass., assignor to Automation Research Corporation, Arlington, Mass., a corporation of Massachusetts Filed Dec. 9, 1964, Ser. No. 417,164

6 Claims. (Cl. 234—30)

This invention relates in general to tape-punching devices and in particular to a versatile portable tape perforator capable of manual, semi-automatic or fully automatic operation.

Data recording by means of punched tape is an old concept. In fact, some of the earliest known recorders employed punched tape as the recording medium. Although the need for data recording has grown enormously, especially in recent years with the expanding use of computers, nothing has been developed to render punched tape obsolete as a recording medium. On the contrary, there has been a development of increasingly sophisticated tape-punching equipment to match the growth of data recording.

In the growth and refinement of tape-punching devices, great strides have been made in speed of operation, reliability, information storage capacity, noise reduction and the like. However, there are numerous potential areas of use that have been overlooked because there has not been available a simple, compact, inexpensive portable tape perforator. The present invention has as its primary object the filling of the need for such a device.

Generally, the invention consists in a tape-punching device built in accordance with modular design concepts which permit the installation of a motor and power supply for semi-automatic rather than manual operation and which permit replacement of a keyboard by a solenoid bank to change the unit to completely automatic operation. A skew arrangement of punches relative to tape permits diagonal punching of tape, which provides larger spacing between punches and perforations while permitting the use of identical straight-line linkages between the punches and their actuating mechanism. In the punching device, general simplification of structures, and reduction of weight and cost are also achieved. However, despite the many changes and improvements, the conventional one-inch tape is retained.

A unique device for setting up a code, and a universal actuator manually, semi-automatically or automatically operable to punch the code, release the code interlock, and feed tape are all features of the invention. Also, easily detachable supply and take-up cassettes for tape are provided to extend the usefulness and diversity of applications of the punch. The supply cassette includes an interlock mechanism which comes into play when the supply of tape is exhausted to lock the universal actuator against further attempted punching. Also, the take-up cassette includes means for maintaining the tape in tension at all times to insure clean, accurate punching without interference with available manual tape feed.

For a better understanding of the present invention together with other and further objects, advantages and features, reference should be made to the following detailed description of a preferred embodiment, which should be read in conjunction with the appended drawings, in which.

Figure 1:
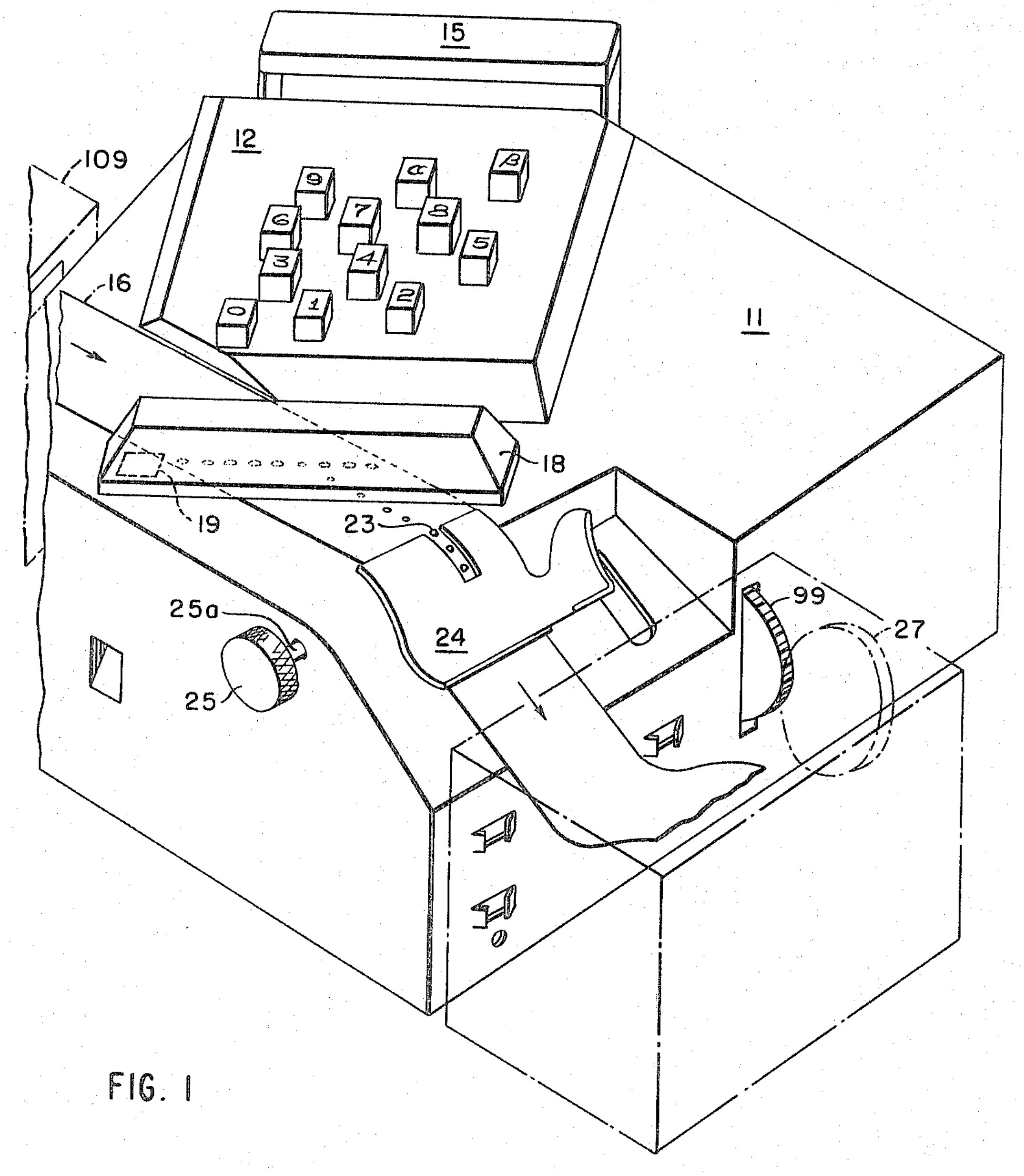
FIG. 1 is a view in perspective of a tape-punching device incorporating the present invention.

In FIG. 1, a shroud or housing 11 is shown as enclosing substantially the entire mechanism of the tape perforator. Mounted upon, and diagonally relative to, the top of the housing 11 is a keyboard 12. The keyboard 12 may include any reasonable number of keys, depending upon the function to be served by the tape punch. In the present instance, twelve keys are shown and they are designated 0, 1, 2, 3, 4, 5, 6, 7, 8, 9, $\alpha$, and $\beta$. Although, as noted, other arrangements are perfectly feasible, the present arrangement is suitable for use with a binary code, and the $\alpha$ and $\beta$ keys are available for other instructions such as "ERASE," "DELETE," "PUNCH ALL HOLES" or the like. A conventional code may include five holes at one side and three at the other with a smaller central hole for feed purposes as shown.

After the desired code is set up by depressing the appropriate key, the code is punched into the tape by means of a main bail 15, which constitutes a universal actuator. As is explained in greater detail below, when the bail 15 is depressed, the code, which was preselected by depressing a key, is punched into the tape, the keyboard selection is cleared, and the tape is fed forward.

A supply of tape 16 is provided from a supply cassette 17, partly shown in outline in FIG. 1, detachably mounted at the rear of the housing 11. The tape 16 runs from the cassette 17 at the rear of the housing to a punch-and-die mechanism beneath the cover 18. Here the tape is oriented with its axis tilted at an angle to that of the die plate of the code punches. A chad chute 19 is provided to direct the chad through an opening 20 in the wall of the housing adjacent which a detachable chad collector (not shown) may be attached and arranged for easy removal.

The tape is perforated centrally as described below to provide spaced openings to be engaged by a sprocket 23 with which it is maintained in engagement by a guide 24. The sprocket 23 is mounted upon a shaft **25*a* which extends through the housing and which carries a knob 25 to permit manual advance of the tape. A take-up cassette, also shown in outline, may be detachably mounted on the front surface of the housing by tabs extending into openings 26. The cassette preferably includes a gear 27 shown in outline and designed to mesh with a gear 99** shown protruding through that same front surface. The srtuctural details, operation and function of the gearing are also explained in greater detail below.

Figure 2:
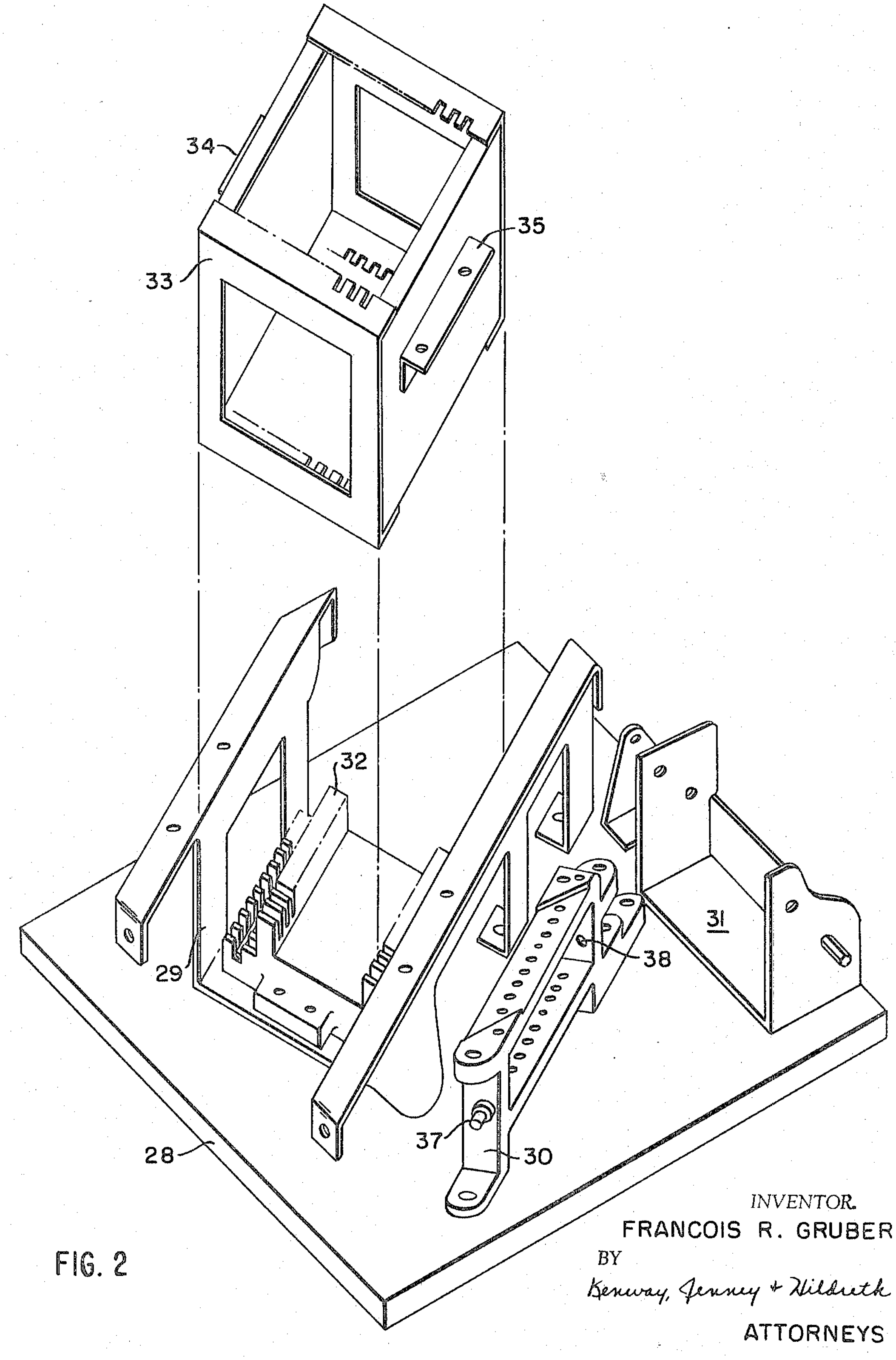
FIG. 2 is an exploded view of certain of the internal components of the device of FIG. 1.

In FIG. 2, the framing of the device is illustrated. Attached to a main base 28 are three brackets 29, 30 and 31. The first of these, the bracket 29, may be attached to the main base 27 by means of screws, rivets or the like, and it, in turn, carries a tripping bar guiding frame 32. A keyboard guiding frame 33 is provided with two ears 34 and 35 at its sides in order that it may be aligned with and supported by the bracket 29. The second bracket 30, preferably cast, is also attached by means of screws or the like to the main base 28. The second bracket supports and guides the punches for code perforation. The same bracket 30 also supports and guides an additional punch to provide perforations for tape feed purposes. These are the previously mentioned perforations punched centrally in the tape to be engaged by the teeth of the sprocket 23. The openings 29a formed in the bracket 29 are arranged in a line which is at an angle to the path of the tape with the result that punches guided by the openings contact the tape in a diagonal pattern.

Two pivot pins 37 and 38 are also mounted on the bracket 30. These pins serve as the pivotal axis for the bail 15 which is the universal actuator of the apparatus. The third bracket 31 is attached to the main base 28 in a fashion similar to the other brackets to provide support for the tape drive mechanism, also shown and described in greater detail below.

Figure 3:
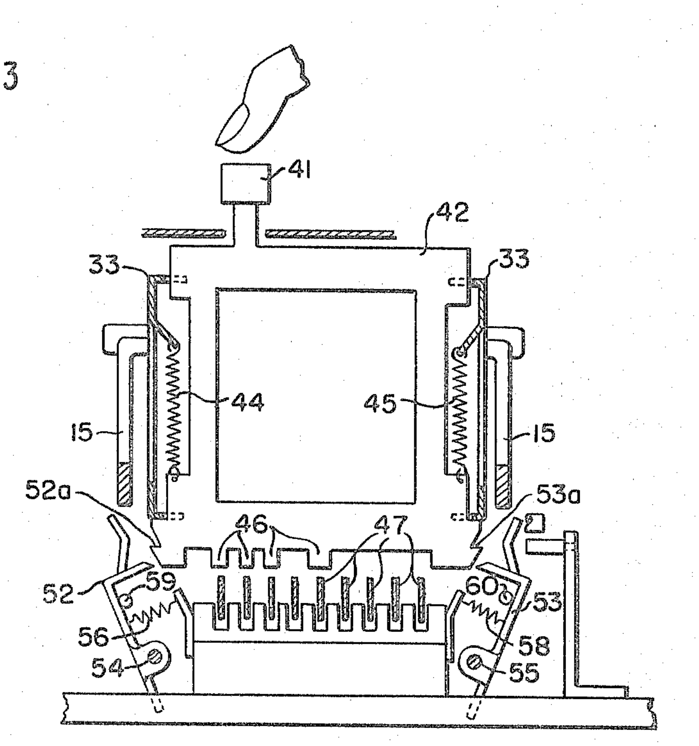
FIG. 3 is a view in section illustrating details of the keyboard mechanism of the device.

In FIG. 3, there is illustrated a cross-section of the keyboard and tripping bar lever arrangement, which form the principal components of the encoding combination. As may be noted from an examination of FIG. 2, the inner edges of two matching pairs of members of the frame 33 are slotted. A typical key assembly which includes a key 41 mounted atop a generally rectangular framework 42 is arranged for sliding vertical movement in opposing slots of the two pairs of members of the frame 33. A pair of tension springs 44 and 45 at opposite sides of the key framework 42 maintain the key normally in an elevated or upper position.

At the bottom of the key framework are a series of fingers 46, which establish the code for each key. A tripping bar 47 is disposed in each slot of the frame 32 opposite each finger position on the several key frameworks. Thus, as any key is depressed, its associated key framework moves into a lower position and tripping bars as determined by the key code will be contacted and displaced by the fingers associated with the framework of that key. Two similar pivoting latching levers 52 and 53 extend the length of the frame 33 and are designed to engage notches 52a and 53a in the lower sides of all key frameworks. The levers 52 and 53 pivot on the bracket 29 about the pins 54 and 55. They are normally spring-loaded by the tension springs 46 and 48 against the stops 59 and 60, respectively. However, when a key is depressed and a tripping bar or tripping bars pivot downwardly, the key latch levers 52 and 53 are caused to engage the notches 52a and 53a, which are common to all of the key frameworks, and hold that key assembly down. Thus, the code to be punched into the tape is preset by the setting of the tripping bars. When the bail 15 is depressed to punch the preset code into the tape, it will at the end of its down stroke cause both the latch levers 52 and 53 to pivot outwardly, thereby releasing the selected key or keys, as may be seen more clearly in subsequent figures of the drawing.

Figure 4:
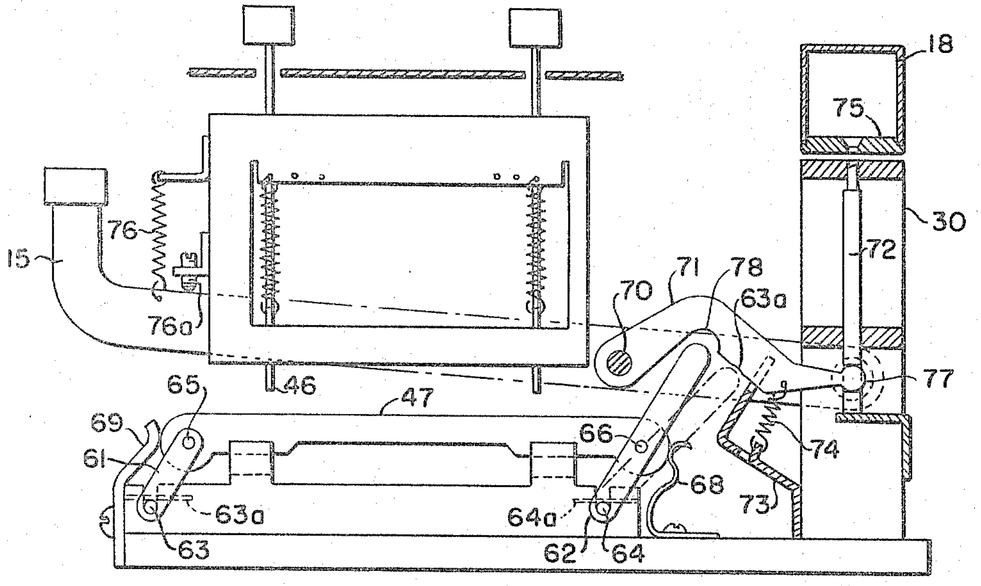
FIG. 4 is a view in section showing details of the punch and interlock mechanism.

In FIG. 4, the encoding assembly is further illustrated by the keyboard and punching mechanism, which are shown in a cross-section taken at right angles to that of FIG. 3. In this view, the action of the bail 15 subsequent to the presetting or insertion of the code by the depressing of a key may be more clearly seen. In a typical linkage, a key framework when depressed brings the finger 46 against the tripping bar 47. Motion of the bar 47 is limited by the slots in which it is disposed and which may also be seen in FIG. 3. A parallelogram arrangement which includes links 61 and 62 supports the tripping bar 47. The links themselves are supported adjacent their lower ends for rotation on pivots 63 and 64. Connection between the tripping bar 47 and the upper end of the link 61 is through a pivot pin 65, and connection of the tripping bar 47 to the link 62 is through a pivot pin 66. The pivots 63 and 64 may be retained in grooves formed in the frame 29 as by the pins 63a and 64a.

Normally, the tripping bar 47 is spring loaded into the upper position in which it is shown by the spring 68 which urges the bar against the stop 69. A shaft 70 is carried by an arm of the bail 15, and mounted upon and pivotable about the shaft 70 is an interlocking lever 71. A bracket 73 guides and limits the downward motion of the interlocking lever 71 which is normally urged downwardly by a spring 74.

A punch 72 arranged for vertical sliding movement in the bracket 30 performs the tape perforating function by puncturing the tape disposed beneath a die plate 75, the tape actually being threaded between the top of the bracket 30 and the die plate 75. The chad housing 18 into which chad is pushed by the punch forms an enclosure above the die plate 75.

Two identical springs connected to the arms of the bail 15 maintain the bail normally in its upper position, as shown, and return it to that position after it is depressed. Only the spring 76 is visible in this view. The pivot pins 37 and 38 visible in FIG. 2 form the axis about which the bail 15 pivots. An adjustment screw 76a is available to limit the travel of the bail, the screw being threaded into an extension mounted on the bracket 29 and butting against the arm of the bail 15.

The actual operation of inserting code and punching it into the tape is best understood by referring to FIGS. 3 and 4. Assuming, for example, that the tripping bar 47 is selected by the depressing of a key and the ensuing movement of the finger 46 against that tripping bar, the code thus selected or preset is punched into the tape by depressing the bail 15. The sequence of action is, first, the depressing of a key to cause the tripping bar to move clockwise to the right and down from the position in which it is shown in FIG. 4. The key assembly is then latched by the levers 52 and 53. Movement of the tripping bar causes the links 62 and 63 also to pivot in a clockwise direction, the link 62 assuming the position shown in dotted lines. Then, the bail 15 is depressed to punch the selected code into the tape. As it comes down, the interlocking lever 71 pivots about the point 63a at which the link 62 serves as a fulcrum for the lever 71. As that shaft 70 is carried down with motion of the bail 15, the interlocking lever 71 rotates counterclockwise about the point 63a and the head 77 raises the punch 72 to perforate the paper tape.

Should it be attempted to depress the bail 15 without having previously depressed a key, the link 62 will, of course, be in the position indicated by the unbroken lines. The interlocking lever 71 will then contact the link 62 at a point displaced by the semicircular cut-out 78 at which it cannot serve as a fulcrum, and no motion will be transmitted to the punch 72. It will be noted that the interlock lever 71 is so shaped and that the semicircular cut-out 78 is positioned such that wear is minimized when a false attempt to actuate the punch is made. The bail 15 pivots on an axis which includes the head 77 and the points 70, 63a and 75 are in a substantially straight line so relative motion between the interlocking lever 71 and the bail arm is non-existent.

Reverting to the action which takes place when a key has been depressed, however, it will be seen from FIG. 3 that the arms of the bail 15 will contact the tops of the latches 52 and 53 at the end of their travel and force these latches outward to release the key framework.

Figures 5, 8:
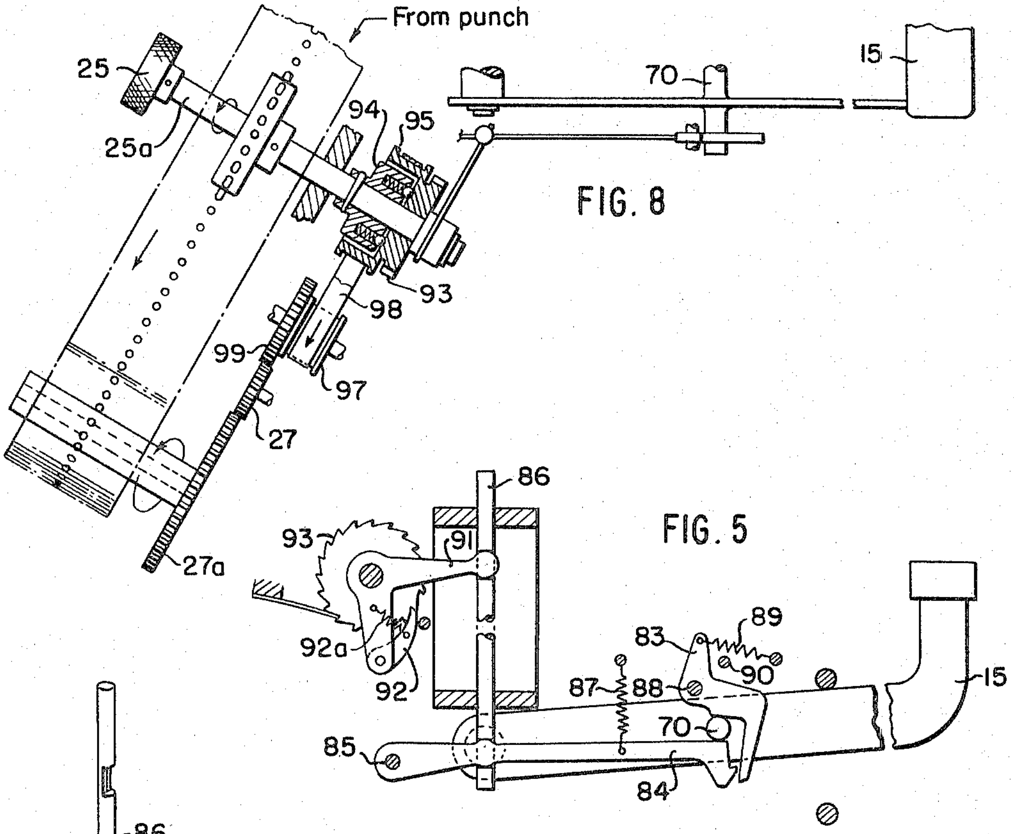
FIG. 5 is a view in section of the tape feed mechanism showing the bail in its upper position.
FIG. 8 is a top view, partly in section, of the entire tape feed mechanism.
Figure 6:
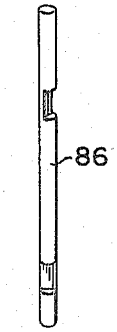
FIG. 6 is a perspective view of the connecting arm between the bail and the ratchet-and-pawl mechanism.
Figure 7:
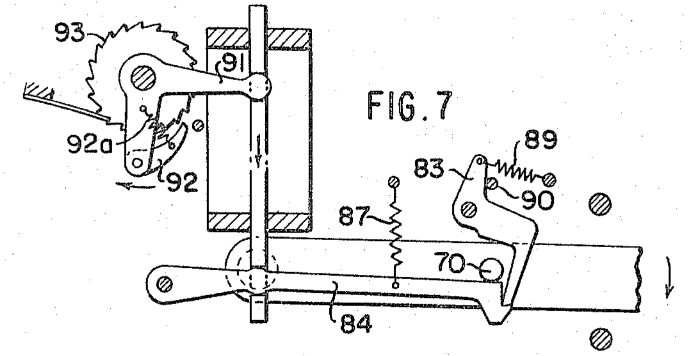
FIG. 7 is a view similar to FIG. 5 with the bail in a depressed position.

In FIGS. 5 through 9, detail on the tape feed mechanism is illustrated. The shaft 70 carried by the bail 15 protrudes through and beyond the bail arm. Below the shaft 70, as seen in FIGS. 5 and 7, is a relatively long lever 84, rotatable upon a fixed pivot 85. A connecting bar 86 shown in detail in FIG. 6 is provided with spaced slotted openings in its side in the lower one of which a rounded portion of the lever 74 is engaged. The lever 84 is normally spring loaded by a tension spring 87 into an upper position against the shaft 70, causing the connecting bar 86 also to be normally held in an upper position, all as shown in FIG. 5. However, when the bail 15 is depressed, a latch lever 83, which oscillates upon a fixed pivot 88, turns under the urging of a tension spring 89 until it contacts a fixed stop 90. As the bail 15 continues down, the lever 84 is latched by engagement of its right-hand end with the lower end of the latch lever 83.

The connecting bar 86 moves downward vertically with the downward motion of the bail 15, bringing with it an arm 91 of a pawl actuator. The pawl 92 rides in a clockwise direction over the teeth of a ratchet 93 against which it is held by a tension spring 92*a*. The tape feed mechanism which includes the pawl 92 and the ratchet 93 is similar to that disclosed in U.S. Patent No. 3,117,717, and the feeding motion for the tape is similar to that described in that patent.

The return motion of the bail 15 to the position in which it is shown in FIG. 5 actually feeds the tape forward. As the bail, after being depressed to the limit, begins its return to the upper position under the influence of the spring 76 and its companion spring, the latch lever 83 maintains the lever 84 at its lower position until the shaft 70 forces the end of the latch lever 83 to move out of engagement with the end of the lever 84. This occurs while the punch is below the paper tape and the spring 87 causes the lever 84 to rise as the shaft 70 rises. As the lever 84 rises, the connecting arm 86 slides upward carrying with it the arm 91. The pawl 92 then is urged into contact with the teeth of the ratchet 93 and advances the ratchet by one tooth. The design of the ratchet and the spacing of feed punches is such that the tape is fed forward 0.100" with each advance.

The interconnection of the ratchet and pawl and tape-feeding mechanism including the manual feed knob 25 is shown in greater detail in FIG. 8, and it will be seen that the mechanism is quite similar to that of U.S. Patent No. 3,117,717.

As in the patented structure, there is pinned or otherwise fixed to the shaft 25*a* the inner member of a ball-and-spring detent mechanism 94. Mounted upon the outer member of that mechanism is a pulley 95 which may be integral with the ratchet 93.

Figure 9:
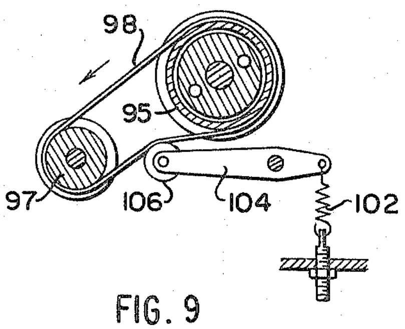
FIG. 9 is a view, partly in section, showing a tension device for the tape feed mechanism.

As may be seen in FIG. 9, the pulley 95 is connected by means of a belt 98 to a second pulley 97. The belt 98 is held in tension upon the pulleys by means of an idler 106 urged against the belt by a tension spring 102 and a pivoted lever 104.

The pulley 97 is fixed in common with the gear 99 to a shaft and it meshes with the idler gear 27 of a cassette. Finally, the gear 27*a* is fixed to the spool of the cassette. When the ratchet 93 is actuated by the bail 15, its motion is transmitted to the take-up spool by way of the belt and pulleys and gear train to draw the tape into the cassette. The shaft 25*a* is also rotated through the ball-and-spring detent mechanism, but the take-up spool is overdriven relative to the shaft 25*a* by reason of the gear train. In this fashion, tension is maintained upon the tape. The overdrive is possible without breaking the tape because of the slip-clutch action of the belt on the pulleys.

Figure 11:
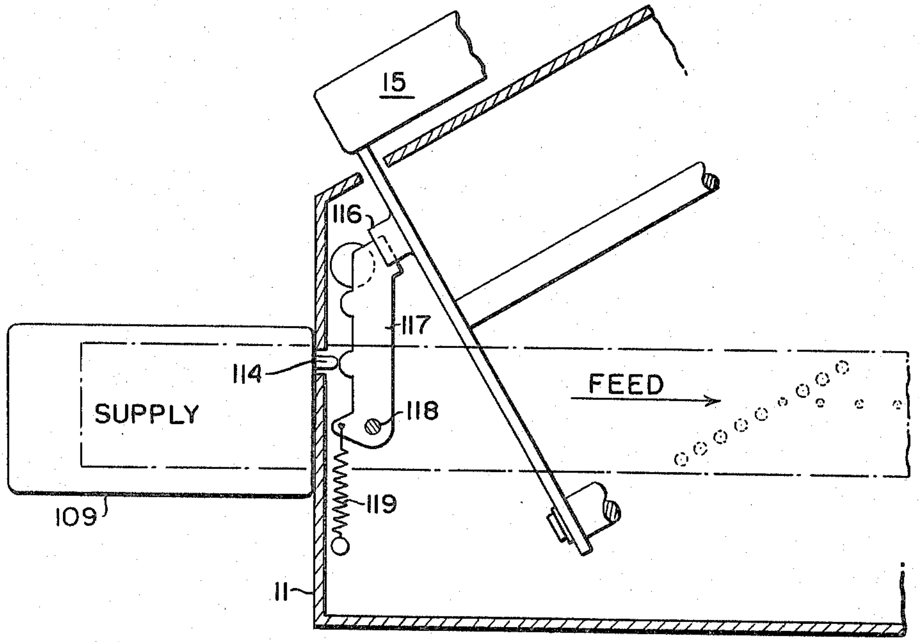
FIG. 11 is a top view showing the mechanism for preventing punching when tape is exhausted.
Figure 10:
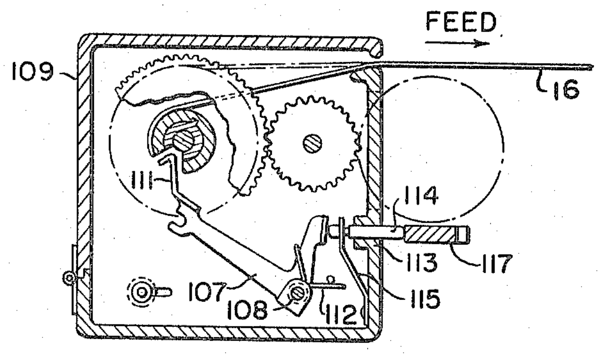
FIG. 10 is a sectional view of a tape cassette.

Manual tape feed is effected by simple rotation of the knob 25 which turns the shaft 25*a* and also transmits motion through the ball-and-spring detent ultimately to the take-up spool. Movement of the bail 15 when the supply cassette of paper tape is empty is prevented by structure which is illustrated in FIGS. 10 and 11. The tape 16 is visible in both figures as it emerges from the supply cassette. In the detailed sectional view of the supply cassette in FIG. 10, there is shown a housing 109, preferably of plastic and having a hinged cover which snaps shut. Mounted within the housing 109 is a lever 107 freely rotatable on a pivot 108. At the left-hand end of the lever 107, as it is seen in FIG. 9, is a cam arm 111. A hair spring 112 at the opposite end of the lever 107 urges the cam arm 111 against the supply of tape in the spool of the cassette.

An apertured boss 113 on the wall of the supply cassette contains a sliding pin 114 capable of horizontal movement limited by the length of a portion of the pin which is of reduced diameter and is disposed in an opening in a clip 115 which is attached to the inner wall of the cassette.

Referring now to FIG. 11, there may be seen on an arm of the bail 15, an integral ear 116. An interference arm 117 is pivotally mounted on a pin 118 and is urged into contact with the end of the pin 114 by a tension spring 119. At its upper end, the interference arm 117 terminates in a tab which underlies the bail ear 116, preventing downward movement of the bail 15 while the arm is in the position shown. However, when tape is present upon the spool of the cassette, the lever 107 swings in a counterclockwise direction, as shown in FIG. 10, and the pin is permitted to be pushed to the left into the cassette by the counterclockwise movement of the arm 117 under the influence of the spring 119, as shown in FIG. 11. Parenthetically, it should be noted that the same basic structure including gearing is utilized in both supply and take-up cassettes. The end-of-tape mechanism is, of course, inoperative in the take-up cassette.

Figure 12:
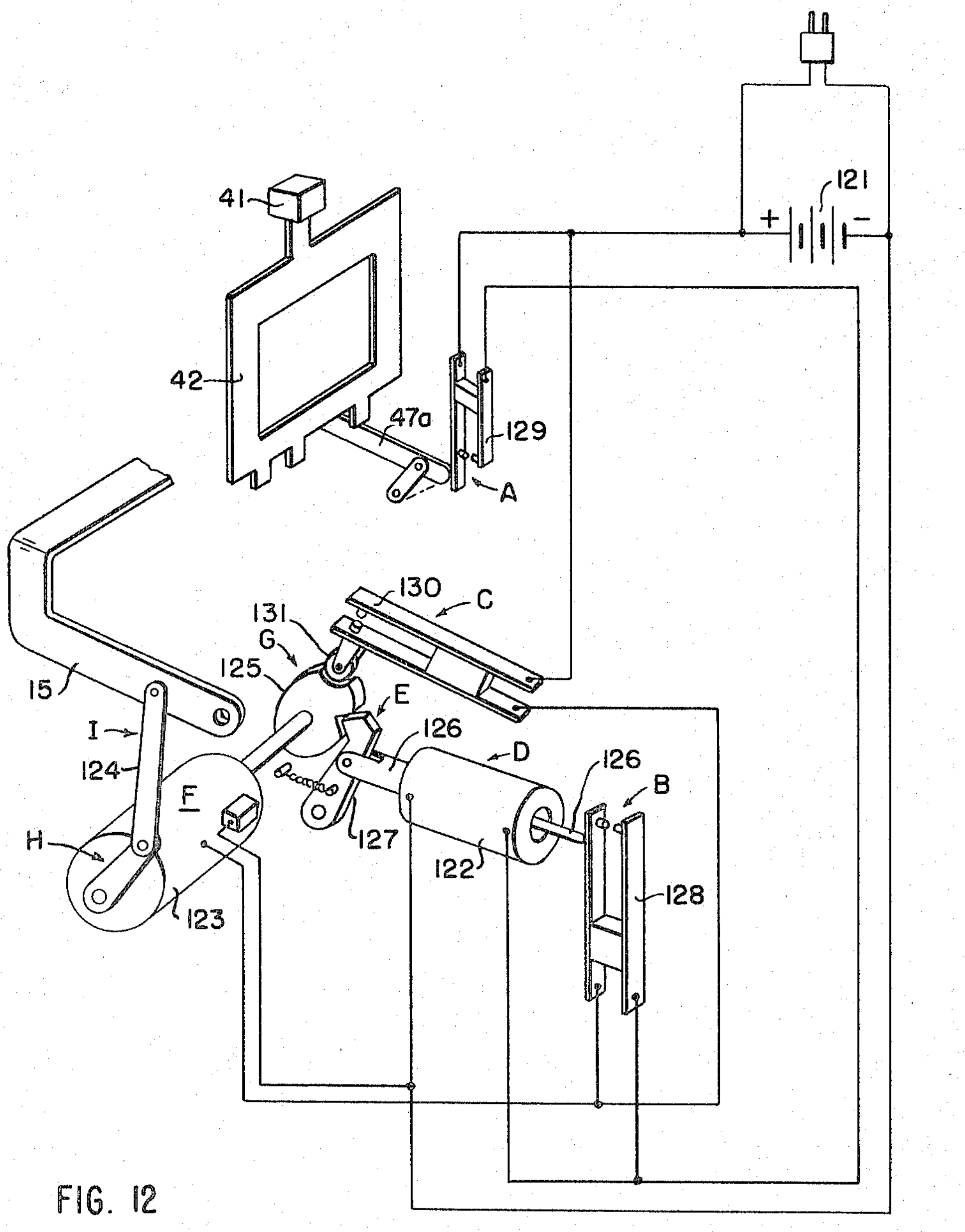
FIG. 12 is a fragmentary exploded view, illustrating a semi-automatic variation of the punch.

The manually operated punch described above may be easily adapted for portable power operation. FIG. 12, an exploded view of the tape punch, shows a rechargeable battery 121, which provides necessary power to operate a solenoid 122 and a D.C. motor 123. At one end of the motor shaft, a bell crank 124 is mounted, and at the other end is a cam disc 125. The solenoid 122 includes a plunger 126 which is connected at one end to a pawl 127 normally lodged in a notch in the cam disc 125. At its other end, the plunger 126 is arranged to actuate a set of contacts 128. A second set of contacts 129 are actuated by the tripping bar 47*a* to provide a circuit between the battery 121 and the solenoid 122, and a third set of contacts 130 are operated by a cam follower 131 on the cam disc 125.

Operation of the power punch is quite similar to that of the manual punch. First, the keyframework 42 is moved downwardly by the depressing of the key 41. A universal tripping bar 47*a* is moved downwardly and laterally as in the manual operation. As the bar 47*a* moves, it closes contacts 129 to place voltage from the battery 121 on one side of the contacts 128 and on one side of the solenoid 122. The other side of the solenoid 122 is permanently connected to the battery 121.

Energization of the solenoid 122 causes the plunger 126 of the solenoid to retract and the pawl 127 is withdrawn from the notch of the cam disc 125. The same movement of the solenoid plunger 126 closes the contacts 128 which completes the circuit from the battery 121 to the motor 123. The bell crank 124 mounted on the shaft of the motor 123 then depresses the bail 15 and the same functions described in connection with manual depression of the bail 15 ensue.

At the same time, the cam disc 125 is rotated. A few degrees of rotation is sufficient to force the cam follower 131 upwardly, closing the contacts 130 to provide a parallel circuit for energizing the motor 123 from the battery 121. Thus, even when the key 41 is released and the contacts 129 reopen, the motor continues to run for a full shaft revolution until the cam follower 131 falls again into the cut-out on the cam disc 125.

With the release of the key 41, and the accompanying opening of the contacts 129, power to the solenoid 122 is cut off and the solenoid plunger 126 moves to the left. The pawl 124 then simply rides upon the surface of the cam disc 125 until it re-engages the notch in which it is shown.

Although what has been disclosed in a preferred embodiment of the present invention capable of modification for self-contained electrical power, other modifications will suggest themselves to those skilled in the art upon a reading of the foregoing specification. Such modifications are believed to be within the purview of the present invention which should be limited only by the spirit and scope of the appended claims.

What is claimed is:

1. A tape perforator comprising a housing, a plurality of supporting frames mounted within said housing, a keyboard supported by a first of said frames, a tape feed mechanism supported by a second of said frames, and a universal actuator supported by a third of said frames, a supply cassette for containing tape to be punched detachably mounted upon said housing, means actuated by said keyboard for setting up a code, means responsive to operation of said universal actuator for punching said code into said tape, and means also responsive to operation of said universal actuator for feeding tape from said supply cassette.

2. Apparatus as in claim 1 wherein said means responsive to operation of said universal actuator for feeding tape includes a connecting bar having notches formed therein, a lever having a rounded end disposed in one of said notches, and means for connecting said lever to said universal actuator during movement thereof to cause rotation of said rounded end during motion of said connecting bar.

3. A tape perforator comprising a housing, a plurality of supporting frames mounted within said housing, a keyboard supported by a first of said frames, a tape feed mechanism supported by a second of said frames, and a universal actuator supported by a third of said frames, a supply cassette for containing tape to be punched detachably mounted upon said housing, means actuated by said keyboard for setting up a code, means interconnecting said supply cassette with said universal actuator for preventing operation of said actuator in the absence of tape in said supply cassette, a plurality of punches for perforating said tape, and means linking said universal actuator to selected ones of said punches as determined by said code, whereby said selected ones of said punches perforate said tape in response to operation of said universal actuator.

4. Apparatus as in claim 3 wherein said means linking said universal actuator to selected ones of said punches includes at least a lever having a rounded end, each of said punches having a notch formed therein receiving said rounded end, operation of said universal actuator causing rotation of said rounded end in said notch during motion of said selected ones of said punches.

5. In a portable tape perforator having a plurality of punches and means for actuating said punches to perforate said tape in accordance with a selected code, the combination with said actuating means of a tape feed mechanism comprising a shaft directly driven by said actuating means, a sprocket mounted on said shaft for engaging perforations formed in said tape by one of said punches, a take-up spool for collecting said tape after perforation thereof, a gear train and a slip-clutch connected between said take-up spool and said actuator, said gear train amplifying the motion of said take-up spool relative to motion of said shaft whereby tension is maintained upon said tape.

6. In a portable tape perforator having a supply cassette containing a spool on which tape is wound and means for punching a code into said tape, the combination of an interference arm pivotable into the path of said punching means to prevent operation thereof, means normally urging said interference arm out of said path, a sliding pin protruding from said supply cassette and contacting said interence arm, a lever mounted in said supply cassette and having one end thereof contacting said sliding pin and the other end thereof contacting said spool of tape, said spool having a peripheral opening formed therein to receive said other end of said lever in the absence of tape upon said spool, and means for urging said other end of said lever into said opening and said one end against said pin to force said interference arm into the path of said punching means in the absence of tape upon said spool.

References Cited by the Examiner

UNITED STATES PATENTS

| | | | |
|---|---|---|---|
| 1,827,002 | 10/1931 | Ewald | 234—102 |
| 2,620,877 | 12/1952 | Furman | 234—110 X |
| 2,732,899 | 1/1956 | Wales. | |
| 2,965,170 | 12/1960 | Perez et al. | 234—30 |
| 3,095,141 | 6/1963 | Baer | 234—92 X |

WILLIAM S. LAWSON, *Primary Examiner.*